US009796412B2

(12) United States Patent
Sakaguchi

(10) Patent No.: US 9,796,412 B2
(45) Date of Patent: Oct. 24, 2017

(54) ELECTRIC POWER STEERING APPARATUS

(71) Applicant: NSK Ltd., Tokyo (JP)

(72) Inventor: Toru Sakaguchi, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/103,037

(22) PCT Filed: Jun. 4, 2015

(86) PCT No.: PCT/JP2015/066240
§ 371 (c)(1),
(2) Date: Jun. 9, 2016

(87) PCT Pub. No.: WO2015/198831
PCT Pub. Date: Dec. 30, 2015

(65) Prior Publication Data
US 2017/0096163 A1  Apr. 6, 2017

(30) Foreign Application Priority Data

Jun. 25, 2014  (JP) .................................. 2014-130175

(51) Int. Cl.
*B62D 5/04*  (2006.01)
*B62D 15/02*  (2006.01)
*B62D 6/02*  (2006.01)
*B62D 6/10*  (2006.01)

(52) U.S. Cl.
CPC ............. *B62D 5/0463* (2013.01); *B62D 6/02* (2013.01); *B62D 6/10* (2013.01); *B62D 15/0215* (2013.01)

(58) Field of Classification Search
CPC .......... B62D 5/0463; B62D 6/10; B62D 6/02; B62D 15/0215
See application file for complete search history.

(56) References Cited

U.S. PATENT DOCUMENTS

| 2011/0190986 | A1* | 8/2011 | Bitou | B62D 5/0463 701/41 |
| 2012/0191301 | A1* | 7/2012 | Benyo | B62D 5/0481 701/41 |
| 2012/0303218 | A1* | 11/2012 | Tamura | B62D 1/02 701/41 |
| 2012/0312627 | A1* | 12/2012 | Morishita | B62D 5/0463 180/446 |

(Continued)

FOREIGN PATENT DOCUMENTS

| JP | 2007-022169 A | 2/2007 |
| JP | 2007-331622 A | 12/2007 |

(Continued)

OTHER PUBLICATIONS

International Search Report for PCT/JP2015/066240 dated Aug. 11, 2015 [PCT/ISA/210].

(Continued)

*Primary Examiner* — Rami Khatib
*Assistant Examiner* — Jeffrey Boomer
(74) *Attorney, Agent, or Firm* — Sughrue Mion, PLLC

(57) ABSTRACT

An electric power steering apparatus with a good steering feeling that includes a function for getting out from restraint of a lateral flow or a one-sided flow, and enables acquisition of a better effect that a driver's load is reduced in the lateral flow or the one-sided flow.

22 Claims, 7 Drawing Sheets

(56) References Cited

U.S. PATENT DOCUMENTS

| | | | |
|---|---|---|---|
| 2013/0066524 A1* | 3/2013 | Kitazume | B62D 5/0463 701/42 |
| 2013/0187574 A1* | 7/2013 | Sakaguchi | B62D 5/0481 318/139 |
| 2013/0233639 A1* | 9/2013 | Kodato | B62D 5/0463 180/446 |
| 2013/0261894 A1* | 10/2013 | Kojima | B62D 5/0463 701/41 |
| 2013/0311044 A1* | 11/2013 | Tamaizumi | B62D 5/0463 701/42 |
| 2014/0156144 A1* | 6/2014 | Hoshi | B62D 5/0463 701/41 |
| 2015/0191199 A1* | 7/2015 | Tsubaki | B62D 1/286 701/42 |
| 2015/0191200 A1* | 7/2015 | Tsubaki | B62D 15/0285 701/42 |
| 2015/0353125 A1* | 12/2015 | Tsubaki | B62D 1/286 701/42 |
| 2016/0016606 A1* | 1/2016 | Tsubaki | B62D 5/0472 701/41 |
| 2016/0121924 A1* | 5/2016 | Norstad | B62D 5/0406 701/42 |
| 2017/0096163 A1* | 4/2017 | Sakaguchi | B62D 5/0463 |
| 2017/0106898 A1* | 4/2017 | Sakaguchi | B62D 5/0463 |

FOREIGN PATENT DOCUMENTS

| | | |
|---|---|---|
| JP | 2008-126891 A | 6/2008 |
| JP | 2008-207775 A | 9/2008 |
| JP | 2011-161942 A | 8/2011 |
| JP | 2012-116430 A | 6/2012 |
| JP | 5251898 B2 | 7/2013 |

OTHER PUBLICATIONS

Written Opinion for PCT/JP2015/066240 dated Aug. 11, 2015 [PCT/ISA/237].

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2015/066240 filed Jun. 4, 2015, claiming priority based on Japanese Patent Application No. 2014-130175 filed Jun. 25, 2014, the contents of all of which are incorporated herein by reference in their entirety.

TECHNICAL FIELD

The present invention relates to an electric power steering apparatus that provides a steering mechanism of a vehicle with an assist torque by means of a motor in accordance with a current command value that is calculated based on at least a steering torque, and in particular to a safe electric power steering apparatus with a good steering feeling that has a function for restraining a lateral flow or a one-sided flow by means of a motor current correction value, includes a function for getting out from the restraint of the lateral flow or the one-sided flow by storing a steering angle at the time when a motor correction signal exceeds a threshold while judging straight running, and setting new upper and lower thresholds for its stored value, and enables acquisition of a better effect that a driver's load is reduced in the one-sided flow or the lateral flow.

BACKGROUND ART

An electric power steering apparatus (EPS) which provides a steering mechanism of a vehicle with a steering assist torque by means of a rotational torque of a motor, applies a driving force of the motor that is controlled by electric power supplied from an inverter as the steering assist torque to a steering shaft or a rack shaft by means of a transmission mechanism such as gears. In order to accurately generate the steering assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control on the basis of a steering torque Th detected by the torque sensor 10 and a vehicle speed V detected by a vehicle speed sensor 12, and controls a current supplied to the motor 20 for the EPS on the basis of a voltage control command value Vref obtained by performing compensation or the like with respect to the current command value.

Moreover, the steering angle sensor 14 is not essential, it does not need to be provided, and it is possible to obtain the steering angle from a rotation sensor such as a resolver connected to the motor 20. It is possible to provide an auto-cruise switch 15, and input an auto-cruise signal AS.

A controller area network (CAN) 50 exchanging various information of a vehicle is connected to the control unit 30, and it is possible to receive the vehicle speed V from the CAN 50. Further, it is also possible to connect a non-CAN 51 exchanging a communication, analog/digital signals, a radio wave or the like except with the CAN to the control unit 30.

The control unit 30 mainly comprises a CPU (also including an MPU, an MCU or the like), and general functions performed by programs within the CPU are shown in FIG. 2.

The control unit 30 will be described with reference to FIG. 2. As shown in FIG. 2, the steering torque Th detected by the torque sensor 10 and the vehicle speed V detected by the vehicle speed sensor 12 (or sent from the CAN 50) are inputted into a current command value calculating section 31 for calculating a current command value Iref1. The current command value calculating section 31 calculates the current command value Iref1 that is a control target value of a current supplied to the motor 20 on the basis of the inputted steering torque Th and the inputted vehicle speed V and by using an assist map or the like. The current command value Iref1 is inputted into a current limiting section 33 through an adding section 32A. A current command value Irefm of which a maximum current is limited is inputted into a subtracting section 32B, and a deviation I (Irefm−Im) between the current command value Irefm and a motor current value Im is calculated. The deviation I is inputted into a PI control section 35 for characteristic improvement of steering operations. The voltage control command value Vref of which the characteristic is improved by the PI control section 35 is inputted into a PWM control section 36. Furthermore, the motor 20 is PWM-driven through an inverter circuit 37. The current value Im of the motor 20 is detected by a motor current detector 38 and is fed back to the subtracting section 32B. The inverter circuit 37 is comprised of a bridge circuit of FETs which are used as driving elements.

Further, a compensation signal CM from a compensation signal generating section 34 is added in the adding section 32A, and characteristic compensation of the steering system is performed by the addition of the compensation signal CM so as to improve a convergence, an inertia characteristic or the like. The compensation signal generating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

In such an electric power steering apparatus, a paved surface of a roadway is sloped about 1-2% from a center line to a road shoulder for the purpose of drainage or the like, so that a vehicle tends to be flowed in the direction of the road shoulder, which is a lateral flow or a one-sided flow, if a steering wheel is not kept turned for a long time in the case of running on a straight road fast. Further, wheel alignment breaks because of aging of the vehicle (for example, settling of a suspension bush and aging of a vehicle body), collision to a curbstone or the like, so that the vehicle may not run straight, which is the lateral flow or the one-sided flow, if a driver does not give power to a steering wheel. Such running may impose a large burden to the driver.

Therefore, many improvement methods have been conventionally proposed. For example, a method shown in Japanese Published Unexamined Patent Application No. 2007-22169 A (Patent Document 1) estimates a slope of a road surface in accordance with a vehicle speed, a lateral acceleration (a lateral G), a steering state and information of a navigation system, and corrects a lateral flow or a one-sided flow of a vehicle. A method shown in Japanese Published Unexamined Patent Application No. 2008-207775 A (Patent Document 2) calculates a smoothed torque Ts1 by smoothing a short-term steering torque in straight running, calculates a smoothed torque Ts2 by smoothing a long-term steering torque, judges running on a cant (a slope of a road surface) by the relation between the smoothed torque Ts1 and the smoothed torque Ts2, and corrects a lateral flow or a one-sided flow of a vehicle.

THE LIST OF PRIOR ART DOCUMENTS

Patent Documents

Patent Document 1: Japanese Published Unexamined Patent Application No. 2007-22169 A
Patent Document 2: Japanese Published Unexamined Patent Application No. 2008-207775 A
Patent Document 3: Japanese Patent No. 5251898 B2

SUMMARY OF THE INVENTION

Problems to be Solved by the Invention

However, the above methods shown in Patent Document 1 and Patent Document 2 can correct the lateral flow or the one-sided flow caused by the slope of the road surface (the cant), but have a problem that they cannot correct the lateral flow or the one-sided flow caused by changing wheel alignment because of aging of the vehicle or the like. Further, the method described in Patent Document 1 needs apparatuses such as the navigation system and a lateral acceleration sensor and processing of signals from sensors, so that costs increase, and some vehicles cannot be corrected in accordance with state of the vehicle equipment. The method described in Patent Document 2 is based on the premise that the vehicle runs on the cant after running on a smooth road surface, so that it may be unable to correct the lateral flow or the one-sided flow when the vehicle runs on the cant from the beginning.

There is an electric power steering apparatus disclosed in the publication of Japanese Patent No. 5251898 B2 (Patent Document 3) as an art to solve such a problem. The apparatus disclosed in Patent Document 3 provides an action force detecting means that detects action force (a SAT, a steering torque, reaction force of a column shaft or the like) added to a steering mechanism, a rotation angle detecting means that detects a rotation angle (a steering angle) of the steering mechanism, and a motor current correction value calculating section that judges a running state of a vehicle on the basis of the action force, the rotation angle and a vehicle speed, calculates a motor current correction value on the basis of the result from judging the running state and the action force, and corrects a current command value by the calculated motor current correction value, then drives and controls a motor in accordance with the current command value corrected by the motor current correction value.

FIG. 3 shows an outline configuration of the apparatus (the motor current correction value calculating section 100A) disclosed in Patent Document 3. A steering angle θ, a SAT estimation value and a vehicle speed V are inputted into a straight running judging section 110, at the same time, the steering angle θ is inputted into a reset table 130, the SAT estimation value is inputted into a gain section 101 and the reset table 130, and the vehicle speed V is inputted into a vehicle speed sensitive gain section 133. The straight running judging section 110 judges whether a vehicle runs straightly, and outputs a judgment signal SD. The judgment of straight runningby the straight running judging section 110 is as follows: the judgment of straight running is established (SD=1) when the steering angle θ is within a predetermined range, the vehicle speed V is larger than or equal to a predetermined value, and an absolute value of the SAT estimation value is smaller than or equal to a predetermined value, and otherwise it is not established (SD=0). The gain section 101 multiplies the SAT estimation value by a gain G, and the multiplication result is inputted into a contact 102a in a switching section 102. The reset table 130 outputs a reset gain RG corresponding to the SAT estimation value and the steering angle θ. The reset gain RG is inputted into a multiplying section 132 through a sign inverting section 131.

The judgment signal SD (established=1, not established=0) from the straight running judging section 110 is inputted into a straight running time judging section 120. The straight running time judging section 120 comprises a counting section 121 for counting the judgment signal SD, a limiter 122 having a lower limit (=0) and an upper limit (=500), and a condition judging section 123 that outputs a straight running judgment result SR (=1) when a count value is larger than or equal to 200 (straight running), and outputs the straight running judgment result SR (=0) when the count value is smaller than 200 (not straight running). The straight running judgment result SR switches the contact 102a and a contact 102b in the switching section 102, switches to the contact 102a when the straight running judgment result SR=1, and switches to the contact 102b when the straight running judgment result SR=0. A signal SG1 gotten by multiplying the SAT estimation value by the gain G has been inputted into the contact 102a, and a multiplication result SG2 from the multiplying section 132 has been inputted into the contact 102b.

The contact 102a and 102b in the switching section 102 are switched by the straight running judgment result SR. A steering state signal SG3 outputted from the switching section 102 is inputted into an adding section 103. An addition value gotten by adding the steering state signal SG3 and a signal from a memory unit 107 for storing a signal sampled before the last one is inputted into a multiplying section 105 as a motor correction signal SG4 through a limiter 104, and, at the same time, is inputted into the memory unit 107. A vehicle speed gain Ga from the vehicle speed sensitive gain section 133 is inputted into the multiplying section 105. A multiplication result SG5 gotten by multiplying the vehicle speed gain Ga and the motor correction signal SG4 is outputted as a motor current correction value Imca through a limiter 106. A current command value is corrected by the motor current correction value Imca.

In this way, the electric power steering apparatus described in Patent Document 3 calculates the motor current correction value Imca by the action force detecting means, the rotation angle detecting means and the motor current correction value calculating section 100A, so that it can correct a lateral flow or a one-sided flow caused by a slope of a road surface and/or change of wheel alignment, moreover, it can accurately detect and correct the lateral flow or the one-sided flow of the vehicle in any case, and it is possible to provide the electric power steering apparatus that enables safer and comfortable straight running.

However, it is necessary to make a threshold range (uth-dth) for judging straight running large (for example, ±12°) in order to make the restraint of the lateral flow or the one-sided flow described in Patent Document 3 function effectively. What matters here is as follows. When a driver steers a steering wheel deliberately between the upper straight running judgment threshold uth and the lower straight running judgment threshold dth as shown in FIG. 4B, the motor correction signal shown in FIG. 4A (described in Patent Document 3) is not reset, that is, the correction amount cannot be released, in some cases, there is a possibility that an assist torque remains in the opposite direction against a driver's intension, so that the apparatus limits the correction amount so as not to give the driver uncomfortable feeling and uneasy feeling. The effect that a driver's load is reduced may be limited by limiting the correction amount.

The present invention has been developed in view of the above-described circumstances, and the object of the present invention is to provide a safe electric power steering apparatus with a good steering feeling that includes a function for getting out from the restraint of the one-sided flow or the lateral flow, and enables acquisition of a better effect that the driver's load is reduced in the one-sided flow or the lateral flow.

Means for Solving the Problems

The present invention relates to an electric power steering apparatus that calculates a current command value of a motor which provides a steering mechanism with a steering assist torque based on a steering torque and a vehicle speed of a vehicle, and drives and controls said motor by feedback control, the above-described object of the present invention is achieved by that comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to said straight running judgment result SR, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; wherein said adaptive calculating section resets said motor correction signal to zero by means of said steering angle and said action force when said vehicle departs from the straight running state, sets upper and lower thresholds TH1 and TH2 smaller than a maximum correction value for said motor correction signal, stores said steering angle at the time when an absolute value of said motor correction signal exceeds said threshold TH1 as a steering angle 1, sets thresholds TH3 and TH4 up and down said steering angle 1, and gradually reduces said motor correction signal when said steering angle exceeds said threshold TH3 or TH4; moreover, wherein said adaptive calculating section comprises a condition judging section 1 that outputs a judgment output CN1 based on a present value and a previous value of said motor correction signal, a condition judging section 2 that outputs judgment outputs CN4 and CN5 based on said straight running judgment result SR, said steering angle, said judgment output CN1, said motor correction signal and a judgment output CN2, a condition judging section 3 that outputs a judgment output CN3 based on said steering angle, said judgment outputs CN4 and CN5, and a logical outputting section that outputs a steering state signal by a logical product of said straight running judgment result SR and said judgment output CN3, inputs said judgment output CN5 into a memory unit, makes said judgment output CN5 into said judgment output CN2, and switches generation of said motor correction signal by said judgment output CN3; and wherein said condition judging section 1 performs judgment 1 whether an absolute value of the present value of said motor correction signal is larger than said threshold TH1, and an absolute value of the previous value of said motor correction signal is smaller than or equal to said threshold TH1, outputs said judgment output CN1 made into 1 when said judgment 1 is established, and outputs said judgment output CN1 made into 0 when said judgment 1 is not established.

Further, the above-described object of the present invention is more effectively achieved by an electric power steering apparatus that calculates a current command value of a motor which provides a steering mechanism with a steering assist torque based on a steering torque and a vehicle speed of a vehicle, and drives and controls said motor by feedback control, comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to said straight running judgment result SR, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; wherein said adaptive calculating section resets said motor correction signal to zero by means of said steering angle and said action force when said vehicle departs from the straight running state, sets upper and lower thresholds TH1 and TH2 smaller than a maximum correction value for said motor correction signal, stores said steering angle at the time when an absolute value of said motor correction signal exceeds said threshold TH1 as a steering angle 1, sets thresholds TH3 and TH4 up and down said steering angle 1, and gradually reduces said motor correction signal when said steering angle exceeds said threshold TH3 or TH4; moreover, wherein said adaptive calculating section comprises a condition judging section 1 that outputs a judgment output CN1 based on a present value and a previous value of said motor correction signal, a condition judging section 2 that outputs judgment outputs CN4 and CN5 based on said straight running judgment result SR, said steering angle, said judgment output CN1, said motor correction signal and a judgment output CN2, a condition judging section 3 that outputs a judgment output CN3 based on said steering angle, said judgment outputs CN4 and CN5, and a logical outputting section that outputs a steering state signal by a logical product of said straight running judgment result SR and said judgment output CN3, inputs said judgment output CN5 into a memory unit, makes said judgment output CN5 into said judgment output CN2, and switches generation of said motor correction signal by said judgment output CN3; and wherein said condition judging section 2 performs judgment 21 whether an absolute value of said motor correction signal is smaller than said threshold TH2 and said judgment output CN2 is 1, or said straight running judgment result SR is 0, and judgment 22 whether both said judgment output CN1 and said straight running judgment result SR are 1, outputs both said judgment output CN4 and said judgment output CN5 made into 0 when said judgment 21 is established, outputs said judgment output CN4 made into said steering angle and said judgment output CN5 made into 1 when said judgment 21 is not established and said judgment 22 is established, and outputs said judgment output CN4 made into a previous sampling value and said judgment output CN5 made into a previous sampling value when said judgment 21 is not established and said judgment 22 is not established either.

Further, the above-described object of the present invention is more effectively achieved by an electric power steering apparatus that calculates a current command value of a motor which provides a steering mechanism with a steering assist torque based on a steering torque and a vehicle speed of a vehicle, and drives and controls said motor by feedback control, comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to said straight running judgment result SR, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; wherein said adaptive calculating section resets said motor correction signal to zero by means of said steering angle and said action force when said vehicle departs from the straight running state, sets upper and lower thresholds TH1 and TH2 smaller than a maximum correction value for said motor correction signal, stores said steering angle at the time when an absolute value of said motor correction signal exceeds said threshold TH1 as a steering angle 1, sets thresholds TH3 and TH4 up and down said steering angle 1, and gradually reduces said motor correction signal when said steering angle exceeds said threshold TH3 or TH4; moreover, wherein said adaptive calculating section comprises a condition judging section 1 that outputs a judgment output CN1 based on a present value and a previous value of said motor correction signal, a condition judging section 2 that outputs judgment outputs CN4 and CN5 based on said straight running judgment result SR, said steering angle, said judgment output CN1, said motor correction signal and a judgment output CN2, a condition judging section 3 that outputs a judgment output CN3 based on said steering angle, said judgment outputs CN4 and CN5, and a logical outputting section that outputs a steering state signal by a logical product of said straight running judgment result SR and said judgment output CN3, inputs said judgment output CN5 into a memory unit, makes said judgment output CN5 into said judgment output CN2, and switches generation of said motor correction signal by said judgment output CN3; and wherein said condition judging section 3 performs judgment 31 whether said judgment output CN5 is 0, and judgment 32 whether an absolute value of a difference between said steering angle 1 and said steering angle is larger than a predetermined value S3, outputs said judgment output CN3 made into 1 when said judgment 31 is established, outputs said judgment output CN3 made into 0 when said judgment 31 is not established and said judgment 32 is established, and outputs said judgment output CN3 made into 1 when said judgment 31 is not established and said judgment 32 is not established either.

Further, the above-described object of the present invention is more effectively achieved by an electric power steering apparatus that calculates a current command value of a motor which provides a steering mechanism with a steering assist torque based on a steering torque and a vehicle speed of a vehicle, and drives and controls said motor by feedback control, comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to said straight running judgment result SR, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; wherein said adaptive calculating section resets said motor correction signal to zero by means of said steering angle and said action force when said vehicle departs from the straight running state, sets upper and lower thresholds TH1 and TH2 smaller than a maximum correction value for said motor correction signal, stores said steering angle at the time when an absolute value of said motor correction signal exceeds said threshold TH1 as a steering angle 1, sets thresholds TH3 and TH4 up and down said steering angle 1, and gradually reduces said motor correction signal when said steering angle exceeds said threshold TH3 or TH4; moreover, wherein said adaptive calculating section comprises a condition judging section 1 that outputs a judgment output CN1 based on a present value and a previous value of said motor correction signal, a condition judging section 2 that outputs judgment outputs CN4 and CN5 based on said straight running judgment result SR, said steering angle, said judgment output CN1, said motor correction signal and a judgment output CN2, a condition judging section 3 that outputs a judgment output CN3 based on said steering angle, said judgment outputs CN4 and CN5, and a logical outputting section that outputs a steering state signal by a logical product of said straight running judgment result SR and said judgment output CN3, inputs said judgment output CN5 into a memory unit, makes said judgment output CN5 into said judgment output CN2, and switches generation of said motor correction signal by said judgment output CN3; and wherein said condition judging section 3 performs judgment 31 whether said judgment output CN5 is 0, and judgment 33 whether said steering angle is larger than said threshold TH3 or said steering angle is smaller than said threshold TH4, outputs said judgment output CN3 made into 1 when said judgment 31 is established, outputs said judgment output CN3 made into 0 when said judgment 31 is not established and said judgment 33 is established, and outputs said judgment output CN3 made into 1 when said judgment 31 is not established and said judgment 33 is not established either.

Further, the above-described object of the present invention is more effectively achieved by that wherein gradually reducing said motor correction signal is gradually reducing said motor correction signal towards zero; or wherein said thresholds TH1 and TH2 are larger than zero, and said thresholds TH3 and TH4 set an equal difference of a predetermined value S3 for said steering angle 1; or which releases storing of said steering angle 1 and setting of said thresholds TH3 and TH4 when said motor correction signal becomes smaller than said threshold TH2 after gradually reducing said motor correction signal.

Effects of the Invention

The electric power steering apparatus of the present invention stores the steering angle at the time when the motor correction signal exceeds the threshold in the straight running state, and, at the same time, sets new thresholds up and down (±) its steering angle. Since then, the apparatus judges whether the steering angle exceeds the new thresholds, gradually reduces the motor correction signal towards zero when the steering angle exceeds the new thresholds, and releases (resets) the stored steering angle and the thresholds associated with it when the motor correction signal becomes smaller than the thresholds.

Thus, it is possible to relax the limitation of the motor correction signal, obtain the better effect that the driver's load is reduced in the one-sided flow or the lateral flow, and provide the safe electric power steering apparatus with the good steering feeling.

BRIEF DESCRIPTION OF THE DRAWINGS

In the accompanying drawings.

MODE FOR CARRYING OUT THE INVENTION

Figure 5A:
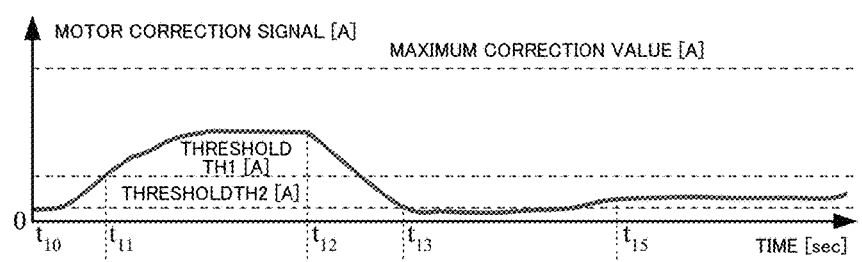
FIGS. 5A and 5B are time charts showing an operation principle of the present invention.
Figure 5B:
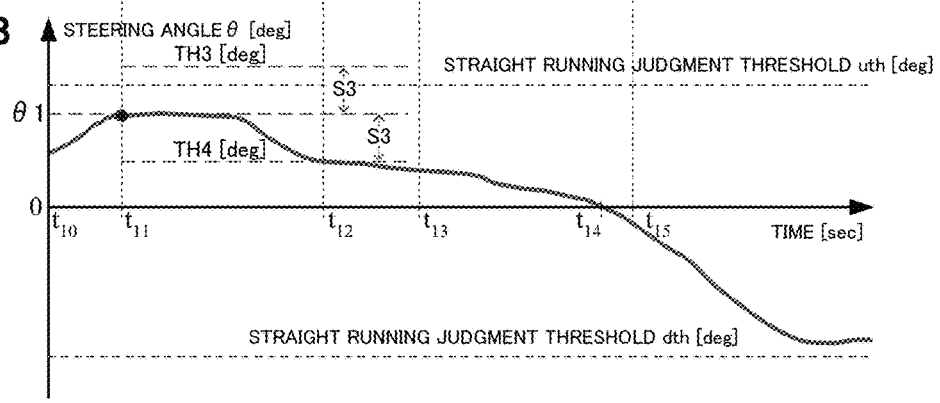

The present invention sets thresholds TH1 and TH2 (TH1>TH2) that are smaller than a maximum correction value for a motor correction signal, and sets straight running judgment thresholds uth and dth for judging straight running for a steering angle θ as shown in FIGS. 5A and 5B. When the motor correction signal exceeds the threshold TH1 in a state that the steering angle θ is between the straight running judgment thresholds uth and dth, in other words a state of straight running (a time point t11), the apparatus stores a steering angle θ1 at that time (the time point t11) to a memory, and, at the same time, sets new thresholds TH3 and TH4 up and down (±S3) the steering angle θ1. Since then, the apparatus judges whether the steering angle θ exceeds the new thresholds TH3 and TH4. The thresholds TH3 and TH4 have a width of the threshold SA for the stored steering angle θ1 respectively. In other words, TH3−θ1=S3 and θ1−TH4=S3. Then, for example, the apparatus gradually reduces the motor correction signal towards zero when the steering angle θ becomes smaller than or equal to the new threshold TH4 at a time point t12 (when the apparatus determines that a driver has steered a vehicle deliberately). The apparatus releases (resets) the stored steering angle θ1 and the thresholds TH3 and TH4 associated with it when the motor correction signal becomes smaller than the threshold TH2 (a time point t13). In this way, a function for getting out from the restraint of the one-sided flow or the lateral flow is added to the present invention.

However, the motor correction signal changes because the judgment of straight running is established after the time point t13 (when the steering angle θ is between the straight running judgment thresholds uth and dth) in the example shown in FIGS. 5A and 5B.

Thus, it is possible to get out from the restraint of the one-sided flow or the lateral flow without giving the driver uncomfortable feeling, relax the limitation of the motor correction signal, obtain the better effect that a driver's load is reduced in the lateral flow or the one-sided flow, and provide a safe electric power steering apparatus with good steering feeling.

Hereinafter, an embodiment of the present invention will be described in detail with reference to the accompanying drawings.

Figure 1:
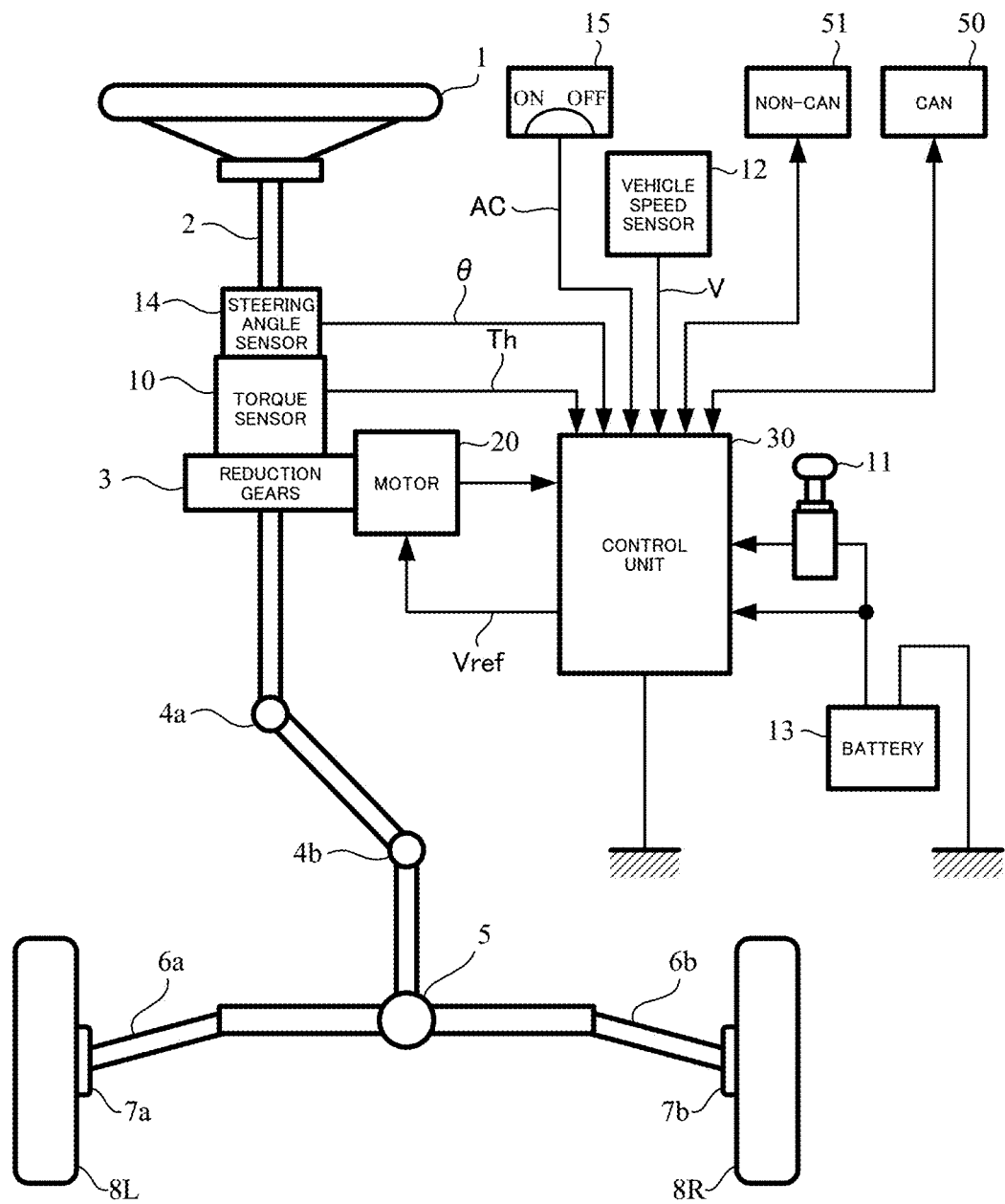
FIG. 1 is a configuration diagram illustrating a general outline of an electric power steering apparatus.
Figure 2:
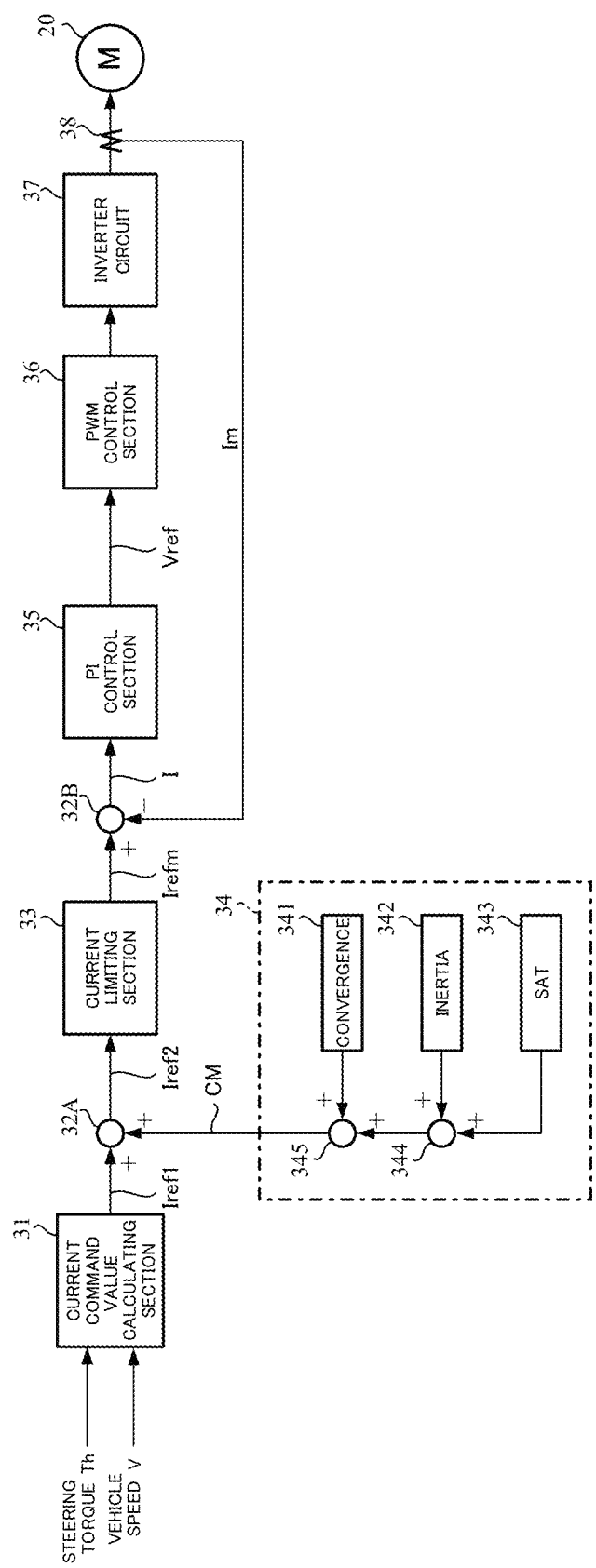
FIG. 2 is a block diagram showing a configuration example of a control unit (ECU) of the electric power steering apparatus.
Figure 3:
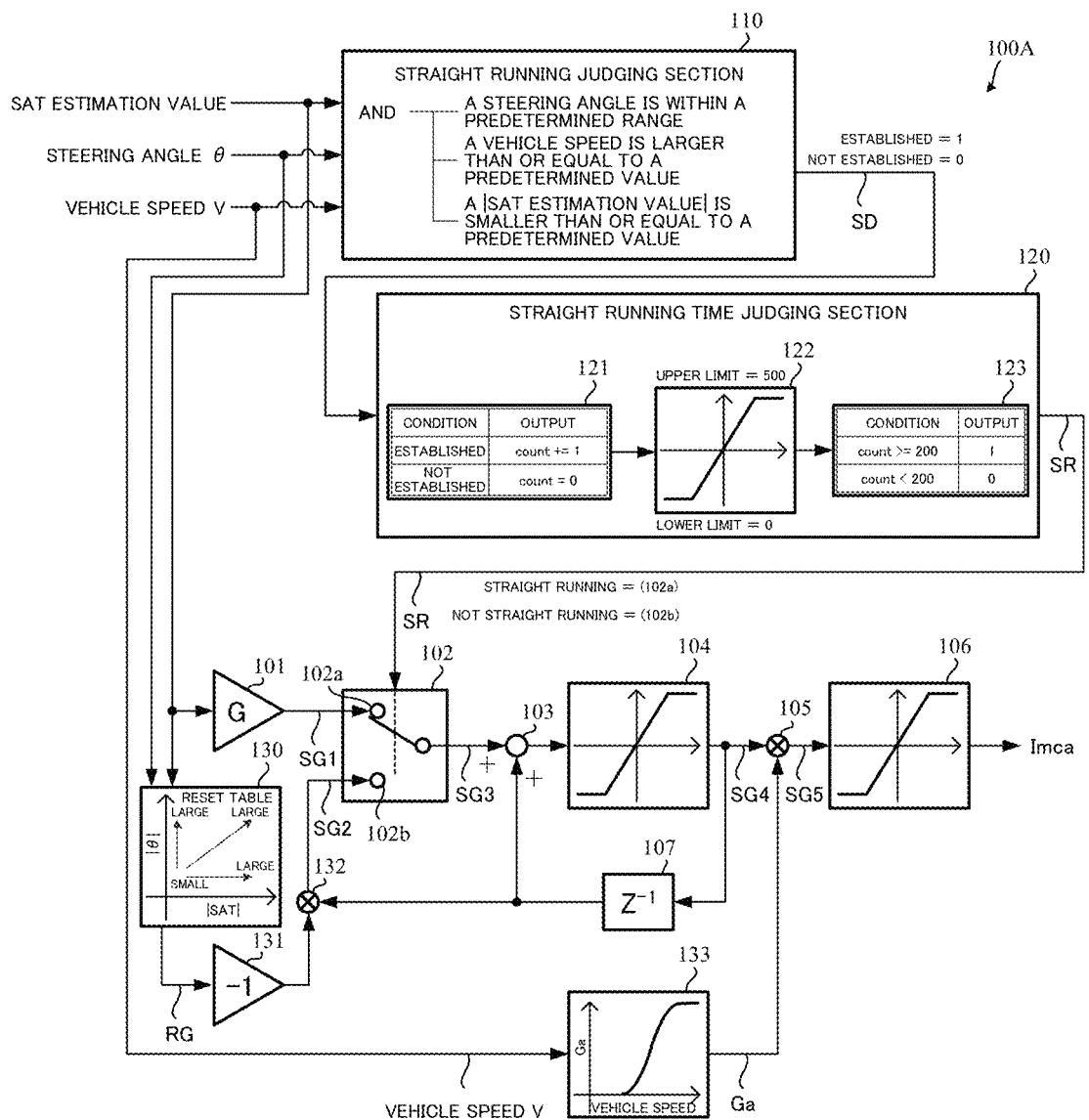
FIG. 3 is a block diagram showing a configuration example of a conventional correction apparatus.
Figure 4A:
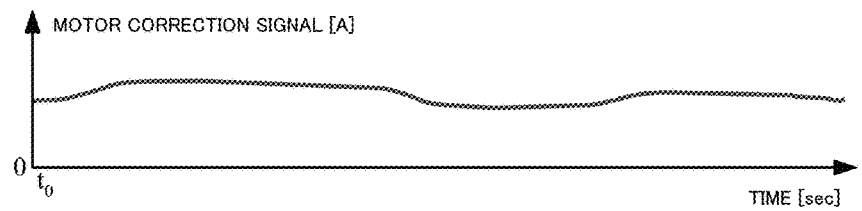
FIGS. 4A and 4B are characteristic diagrams showing a characteristic example of the conventional correction apparatus.
Figure 4B:
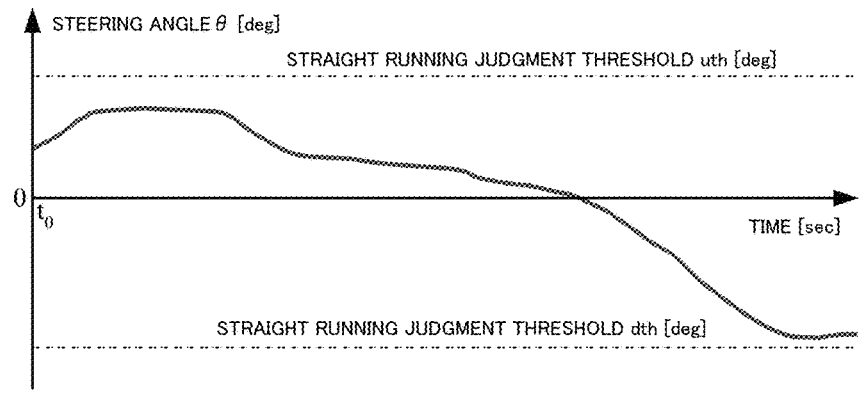
Figure 6:
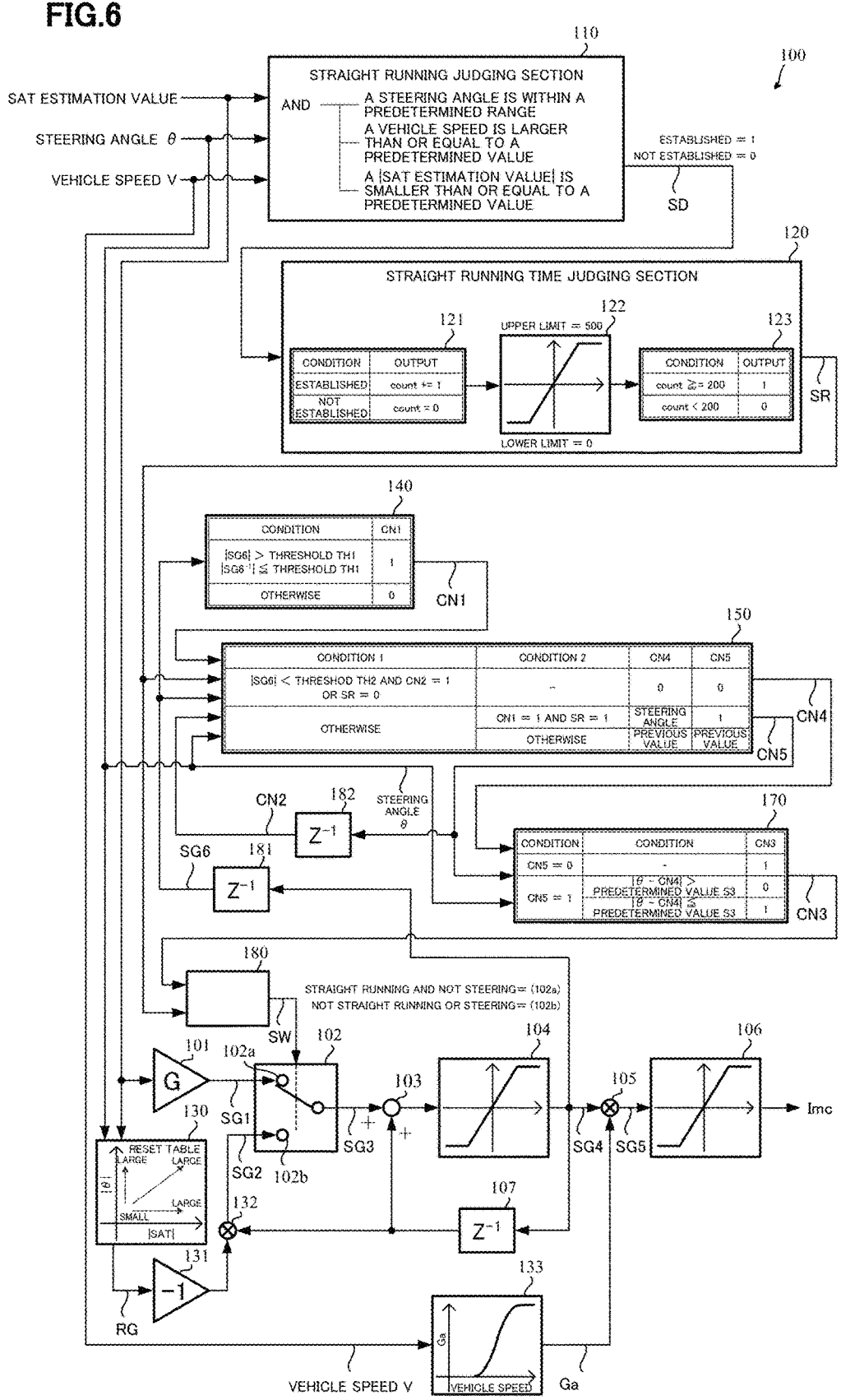
FIG. 6 is a block diagram showing a configuration example of the present invention.

FIG. 6 is a block diagram showing a configuration example of the present invention as corresponding to FIG. 3. A condition judging section 140 is provided that compares a motor correction signal SG6 being a present data from a memory unit 181, which has inputted a motor correction signal SG4 from a limiter 104, and a motor correction signal $SG6^{-1}$ (being a previous data) sampled before the last one with predetermined conditions, and outputs a judgment output CN1. The condition judging section 140 determines and outputs the judgment output CN1 according to the following Expression 1.

[Expression 1]
Condition A1: the judgment output CN1=1 when an absolute value of the present data>the threshold TH1 and an absolute value of the previous data≤the threshold TH1, Condition B1: the judgment output CN1=0, otherwise.

The judgment output CN1 from the condition judging section 140 is inputted into a next section, a condition judging section 150. In addition, a straight running judgment result SR, the steering angle θ, an output SG6 from the memory unit 181 and a judgment output CN2 from a memory unit 182 are inputted into the condition judging section 150. Judgment outputs CN4 and CN5 being judgment results are outputted from the condition judging section 150. The condition judging section 150 judges according to the following Expression 2, and outputs the judgment outputs CN4 and CN5.

[Expression 2]
Condition A2: the judgment outputs CN4=0 and CN5=0 when an absolute value of SG6<the threshold TH2 and CN2=1, or SR=0,
Condition B2: the judgment outputs CN4=the steering angle θ (the present one) and CN5=1 when the condition that the absolute value of SG6<the threshold TH2 and CN2=1, or SR=0 is not established, CN1=1 and SR=1,
Condition C2: the judgment outputs CN4=the previous CN4 and CN5=the previous CN5 except that the absolute value of SG6<the threshold TH2 and CN2=1, or SR=0, and when the condition that CN1=1 and SR=1 is not established.

The judgment outputs CN4 and CN5 from the condition judging section 150 are inputted into a condition judging section 170. In addition, the steering angle θ is inputted into the condition judging section 170, and a judgment output CN3 is outputted from the condition judging section 170. The condition judging section 170 judges according to the following Expression 3, and outputs the judgment output CN3.

[Expression 3]
Condition A3: CN3=1 when CN5=0,
Condition B3: CN3=0 when CN5=1 and an absolute value of (θ−CN4)>the threshold S3,
Condition C3: CN3=1 when CN5=1 and the absolute value of (θ−CN4)≤the threshold S3.

The above conditions B3 and C3 may be the following because CN4=the steering angle θ1 in the case of CN5=1.
Condition B3: CN3=0 when CN5=1, and θ>TH3 or θ<TH4,
Condition C3: CN3=1 when CN5=1, and θ≤TH3 and θ≥TH4.

A straight running state judging section comprises a straight running judging section 110 and a straight running time judging section 120. An adaptive calculating section comprises the condition judging sections 140, 150 and 170, memory units 107, 181 and 182, a reset table 130, a sign inverting section 131, a gain section 101, a switching section 102, a logical outputting section 180, an adding section 103, and a limiter 104. An output calculating section comprises a multiplying section 105 and a limiter 106. A motor current correction value calculating section for calculating and outputting a motor current correction value Imc comprises the straight running state judging section, the adaptive calculating section, a vehicle speed sensitive gain section 133 and the output calculating section.

Figure 7:
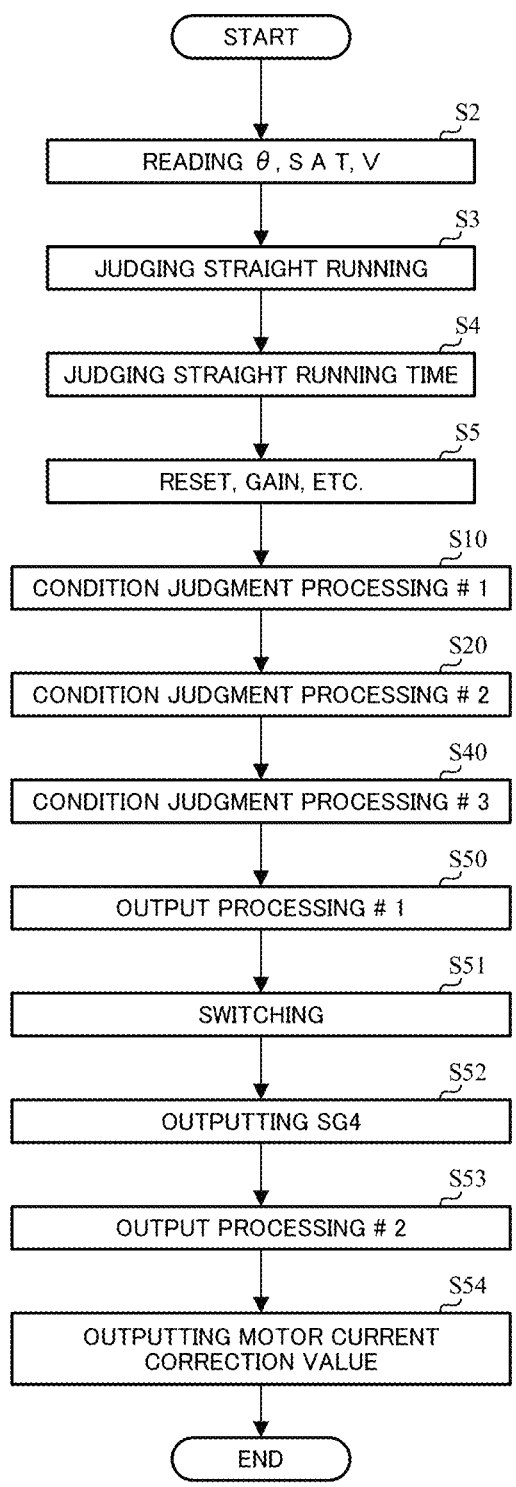
FIG. 7 is a flowchart showing an operating example of the present invention.

An operation example of such a configuration will be described with reference to a flowchart shown in FIG. 7.

First, the apparatus reads the steering angle θ, a SAT estimation value and a vehicle speed V (Step S2). Using them, the straight running judging section 110 judges straight running and outputs a judgment signal SD in the same way described in Patent Document 3 (Step S3). The judgment signal SD is inputted into the straight running time judging section 120, which judges the straight running time in the same way described in Patent Document 3 (Step S4). The straight running judgment result SR is inputted into the condition judging section 150 and the logical outputting section 180.

On the other hand, the SAT estimation value is inputted into the gain section 101 and the reset table 130, and the steering angle θ is inputted into the condition judging sections 150 and 170, and the reset table 130. In the same way as the above, a reset gain RG from the reset table 130 goes through the sign inverting section 131, is multiplied by the output of the memory unit 107 in a multiplying section 132, and is inputted into a contact 102b of the switching section 102. Further, the SAT estimation value is inputted into a contact 102a of the switching section 102 through the gain section 101 (Step S5). An output SG3 of the switching section 102 is outputted as the motor correction signal SG4 through the adding section 103 and the limiter 104. The motor correction signal SG4 is inputted into a multiplying section 105, and at the same time, has been inputted as the data SG6 into the condition judging section 140 through the memory unit 181.

The condition judging section 140 performs condition judgment processing #1 according to the above Expression 1 on the basis of the inputted data SG6 and the threshold TH1 (Step S10), and outputs the judgment output CN1. The judgment output CN1 is inputted into the condition judging section 150, which performs condition judgment processing #2 according to the above Expression 2 on the basis of the judgment output CN1, the straight running judgment result SR, the threshold TH2 and the like (Step S20), and outputs the judgment outputs CN4 and CN5. The judgment outputs CN4 and CN5 are inputted into the condition judging section 170, which performs condition judgment processing #3 according to the above Expression 3 on the basis of the judgment outputs CN4 and CN5, the steering angle θ, and the threshold S3 or the thresholds TH3 and TH4 (Step S40), and outputs the judgment output CN3. Further, the judgment output CN5 has been inputted as the judgment output CN2 into the condition judging section 150 through the memory unit 182.

The judgment output CN3 is inputted into the logical outputting section 180, and output processing #1 with the straight running judgment result SR and CN3 is performed in the logical outputting section 180 (Step S50). A steering state signal SW from the logical outputting section 180 switches the switching section 102 to the contact 102a in the case of straight running and not steering, and switches the switching section 102 to the contact 102b in the case of not straight running or steering (Step S51).

The adding section 103 adds an output signal from the memory unit 107 to a signal SG3 being an output from the switching section 102, the limiter 104 makes the addition result the motor correction signal SG4, and the motor correction signal SG4 is inputted into the condition judging sections 140 and 150 through the memory unit 181 (Step S52). Further, the motor correction signal SG4, to which output processing #2 is performed by the multiplying section 105 and the limiter 106 as the output calculating section (Step S53), is outputted as the motor current correction value Imc (Step S54). The motor current correction value Imc corrects a current command value.

Figure 8A:
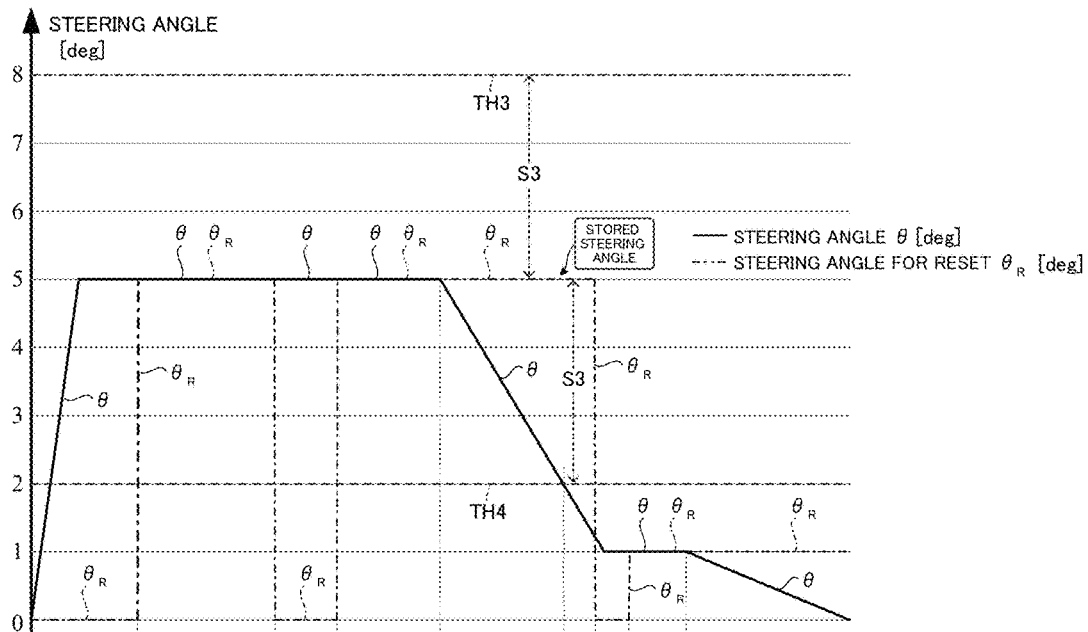
FIGS. 8A, 8B and 8C are time charts showing an operating example (a result of a simulation) of the present invention.
Figure 8B:
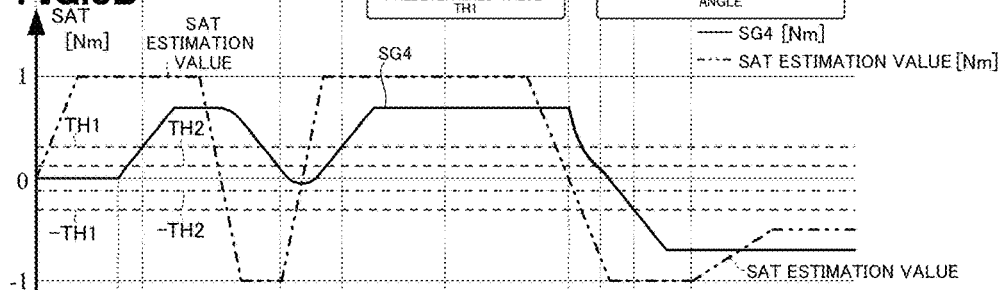
Figure 8C:
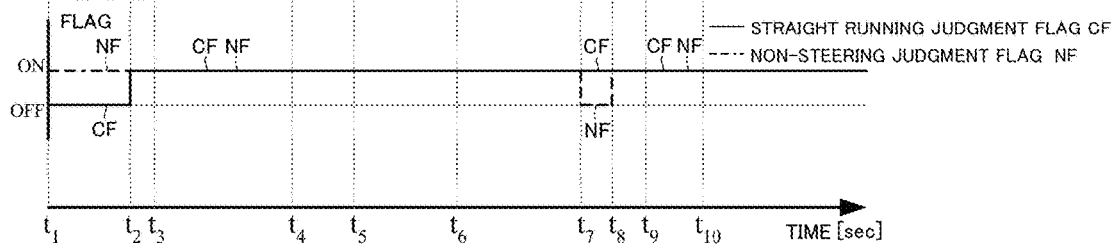

FIGS. 8A, 8B and 8C show a simulation result, FIG. 8A shows a change of the steering angle θ and a stored steering angle $θ_R$, FIG. 8B shows the SAT estimation value and the restraint (the correction value) of the lateral flow or the one-sided flow, and FIG. 8C shows ON/OFF states of a straight running judgment flag CF and non-steering judgment flag NF.

The straight running judgment flag CF is ON after a time point t2. The non-steering judgment flag NF is ON between time points t1-t7, becomes OFF between time points t7-t8, and becomes ON after the time point t8. Since the motor correction signal (SG4) exceeds the threshold TH1 at a time point t3 and a time point t5, the apparatus stores the steering angles θ (stored values $θ_R$) at those times. Further, since the steering angle θ becomes smaller than the threshold TH4 (=$θ_R$−S3), reset processing begins at this time point t7.

Moreover, the above-mentioned is described using the SAT estimation value as an action force added to a steering mechanism, which may be a value detected by a sensor. Further, the above calculates absolute values of signals and detected values, and compares them with thresholds. However, the same comparison operation is possible without calculating the absolute values if the threshold has positive and negative values.

EXPLANATION OF REFERENCE NUMERALS 1 steering wheel
2 column shaft (steering shaft, handle shaft)
10 torque sensor
12 vehicle speed sensor
14 steering angle sensor
15 auto-cruise switch
20 motor
30 control unit (ECU)
31 current command value calculating section
35 PI control section
36 PWM control section
37 inverter circuit
100A, 100 motor current correction value calculating section
110 straight running judging section
120 straight running time judging section
130 reset table
133 vehicle speed sensitive gain section
140,150,170 condition judging section

The invention claimed is:

1. An electric power steering apparatus that calculates a current command value of a motor which provides a steering mechanism with a steering assist torque based on a steering torque and a vehicle speed of a vehicle, and drives and controls said motor by feedback control, comprising:
a motor current correction value calculating section that judges a running state of said vehicle based on an action force added to the steering mechanism, a steering angle of said steering mechanism and said vehicle speed, and calculates and outputs a motor current correction value based on a judgment result of said running state and said action force;
wherein said electric power steering apparatus corrects said current command value by said motor current correction value, and drives and controls said motor;
wherein said motor current correction value calculating section comprises a straight running state judging section that judges a straight running state of said vehicle and outputs a straight running judgment result (SR), an adaptive calculating section that calculates and outputs a motor correction signal according to said straight running judgment result (SR), said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value;
wherein said adaptive calculating section resets said motor correction signal to zero in accordance with said steering angle and said action force when said vehicle departs from the straight running state, sets an upper first threshold (TH1) and a lower second threshold (TH2) that are smaller than a maximum correction value for said motor correction signal, stores said steering angle at a time when an absolute value of said motor correction signal exceeds said first threshold (TH1) as a first steering angle, sets a third threshold (TH3) larger than said first steering angle and a fourth threshold (TH4) smaller than said first steering angle, and reduces said motor correction signal when said steering angle exceeds said third threshold (TH3) or said fourth threshold (TH4);
wherein said adaptive calculating section comprises a first condition judging section that outputs a first judgment output (CN1) based on a present value and a previous value of said motor correction signal, a second condition judging section that outputs a fourth judgment output (CN4) and a fifth judgment output (CN5) based on said straight running judgment result (SR), said steering angle, said first judgment output (CN1), said motor correction signal and a second judgment output (CN2), a third condition judging section that outputs a third judgment output (CN3) based on said steering angle, said fourth judgment output (CN4) and said fifth judgment output (CN5), and a logical outputting section that outputs a steering state signal by a logical product of said straight running judgment result (SR) and said third judgment output (CN3), inputs said fifth judgment output (CN5) into a memory, makes said fifth judgment output (CN5) into said second judgment output (CN2), and switches a signal (SG3) on which said motor correction signal is based depending on said steering state signal; and
wherein said first condition judging section performs a first judgment determining when an absolute value of the present value of said motor correction signal is larger than said first threshold (TH1), and an absolute value of the previous value of said motor correction signal is smaller than or equal to said first threshold (TH1), outputs said first judgment output (CN1) equal to 1 when said first judgment is established, and outputs said first judgment output (CN1) equal to 0 when said first judgment is not established.

2. The electric power steering apparatus according to claim 1, wherein said second condition judging section performs a second judgment determining when an absolute value of said motor correction signal is smaller than said second threshold (TH2) and said second judgment output (CN2) is 1, or said straight running judgment result (SR) is 0, and a third judgment determining when both said first judgment output (CN1) and said straight running judgment result (SR) are 1, outputs said fourth judgment output (CN4) equal to 0 and said fifth judgment output (CN5) equal to 0 when said second judgment is established, outputs said fourth judgment output (CN4) equal to said steering angle and said fifth judgment output (CN5) equal to 1 when said second judgment is not established and said third judgment is established, and outputs said fourth judgment output (CN4) equal to a previous value of said fourth judgment output (CN4) and said fifth judgment output (CN5) equal to a previous value of said fifth judgment output (CN5) when said second judgment is not established and said third judgment is not established either.

3. The electric power steering apparatus according to claim 1, wherein said third condition judging section performs a fourth judgment determining when said fifth judgment output (CN5) is 0, and a fifth judgment determining when an absolute value of a difference between said first steering angle and said steering angle is larger than a predetermined value (S3), outputs said third judgment output (CN3) equal to 1 when said fourth judgment is established, outputs said third judgment output (CN3) equal to 0 when said fourth judgment is not established and said fifth judgment is established, and outputs said third judgment output (CN3) equal to 1 when said fourth judgment is not established and said fifth judgment is not established either.

4. The electric power steering apparatus according to claim 1, wherein said third condition judging section performs a fourth judgment determining when said fifth judgment output (CN5) is 0, and a sixth judgment determining when said steering angle is larger than said third threshold (TH3) or said steering angle is smaller than said fourth threshold (TH4), outputs said third judgment output (CN3) equal to 1 when said fourth judgment is established, outputs said third judgment output (CN3) equal to 0 when said fourth judgment is not established and said sixth judgment is established, and outputs said third judgment output (CN3) equal to 1 when said fourth judgment is not established and said sixth judgment is not established either.

5. The electric power steering apparatus according to claim 1, wherein reducing said motor correction signal is reducing said motor correction signal towards zero.

6. The electric power steering apparatus according to claim 1, wherein said first threshold (TH1) and said second threshold (TH2) are larger than zero, and said third threshold (TH3) and said fourth threshold (TH4) have an equal width of a predetermined value (S3) for said first steering angle respectively.

7. The electric power steering apparatus according to claim 1, which releases storing of said first steering angle and setting of said third thresholds (TH3) and said fourth threshold (TH4) when said motor correction signal becomes smaller than said second threshold (TH2) after reducing said motor correction signal.

8. An electric power steering apparatus that calculates a current command value of a motor which provides a steering mechanism with a steering assist torque based on a steering torque and a vehicle speed of a vehicle, and drives and controls said motor by feedback control, comprising:
a motor current correction value calculating section that judges a running state of said vehicle based on an action force added to the steering mechanism, a steering angle of said steering mechanism and said vehicle speed, and calculates and a motor current correction value based on a judgment result of said running state and said action force;
wherein said electric power steering apparatus corrects said current command value by said motor current correction value, and drives and controls said motor;
wherein said motor current correction value calculating section comprises a straight running state judging section that judges a straight running state of said vehicle and outputs a straight running judgment result (SR), an adaptive calculating section that calculates and outputs a motor correction signal according to said straight running judgment result (SR), said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value;
wherein said adaptive calculating section resets said motor correction signal to zero in accordance with said steering angle and said action force when said vehicle departs from the straight running state, sets an upper first threshold (TH1) and a lower second threshold (TH2) that are smaller than a maximum correction value for said motor correction signal, stores said steering angle at a time when an absolute value of said motor correction signal exceeds said first threshold (TH1) as a first steering angle sets a third threshold (TH3) larger than said first steering angle, and a fourth threshold (TH4) smaller than said first steering angle, and reduces said motor correction signal when said steering angle exceeds said third threshold (TH3) or said fourth threshold (TH4);
wherein said adaptive calculating section comprises a first condition judging section that outputs a first judgment output (CN1) based on a present value and a previous value of said motor correction signal, a second condition judging section that outputs a fourth judgment output (CN4) and a fifth judgment output (CN5) based on said straight running judgment result (SR), said steering angle, said first judgment output (CN1), said motor correction signal and a second judgment output (CN2), a third condition judging section that outputs a third judgment output (CN3) based on said steering angle, said fourth judgment output (CN4) and said fifth judgment output (CN5), and a logical outputting section that outputs a steering state signal by a logical product of said straight running judgment result (SR) and said third judgment output (CN3), inputs said fifth judgment output (CN5) into a memory unit, makes said fifth judgment output (CN5) into said second judgment output (CN2), and switches a signal (SG3) on which said motor correction signal is based depending on said steering state signal; and
wherein said second condition judging section performs a second judgment determining when an absolute value of said motor correction signal is smaller than said second threshold (TH2) and said second judgment output (CN2) is 1, or said straight running judgment result (SR) is 0, and a third judgment determining when both said first judgment output (CN1) and said straight running judgment result (SR) are 1, outputs said fourth judgment output (CN4) equal to 0 and said fifth judgment output (CN5) equal to 0 when said second judgment is established, outputs said fourth judgment output (CN4) equal to said steering angle and said fifth judgment output (CN5) equal to 1 when said second judgment is not established and said third judgment is established, and outputs said fourth judgment output (CN4) equal to a previous value of said fourth judgment output (CN4) and said fifth judgment output (CN5) equal to a previous value of said fifth judgment output (CN5) when said second judgment is not established and said third judgment is not established either.

9. The electric power steering apparatus according to claim 8, wherein said third condition judging section performs a fourth judgment determining when said fifth judgment output (CN5) is 0, and a fifth judgment determining when an absolute value of a difference between said first steering angle and said steering angle is larger than a predetermined value (S3), outputs said third judgment output (CN3) equal to 1 when said fourth judgment is established, outputs said third judgment output (CN3) equal to 0 when said fourth judgment is not established and said fifth judgment is established, and outputs said third judgment output (CN3) equal to 1 when said fourth judgment is not established and said fifth judgment is not established either.

10. The electric power steering apparatus according to claim 8, wherein said third condition judging section performs a fourth judgment determining when said fifth judgment output (CN5) is 0, and a sixth judgment determining when said steering angle is larger than said third threshold (TH3) or said steering angle is smaller than said fourth threshold (TH4), outputs said third judgment output (CN3) equal to 1 when said fourth judgment is established, outputs said third judgment output (CN3) equal to 0 when said fourth judgment is not established and said sixth judgment is established, and outputs said third judgment output (CN3) equal to 1 when said fourth judgment is not established and said sixth judgment is not established either.

11. The electric power steering apparatus according to claim 8, wherein reducing said motor correction signal is reducing said motor correction signal towards zero.

12. The electric power steering apparatus according to claim 8, wherein said first threshold (TH1) and said second threshold (TH2) are larger than zero, and said third threshold (TH3) and said fourth threshold (TH4) have an equal width of a predetermined value (S3) for said first steering angle respectively.

13. The electric power steering apparatus according to claim 8, which releases storing of said first steering angle and setting of said third thresholds (TH3) and said fourth threshold (TH4) when said motor correction signal becomes smaller than said second threshold (TH2) after reducing said motor correction signal.

14. An electric power steering apparatus that calculates a current command value of a motor which provides a steering mechanism with a steering assist torque based on a steering torque and a vehicle speed of a vehicle, and drives and controls said motor by feedback control, comprising:
 a motor current correction value calculating section that judges a running state of said vehicle based on an action force added to the steering mechanism, a steering angle of said steering mechanism and said vehicle speed, and calculates and outputs a motor current correction value based on a judgment result of said running state and said action force;
 wherein said electric power steering apparatus corrects said current command value by said motor current correction value, and drives and controls said motor;
 wherein said motor current correction value calculating section comprises a straight running state judging section that judges a straight running state of said vehicle and outputs a straight running judgment result (SR), an adaptive calculating section that calculates and outputs a motor correction signal according to said straight running judgment result (SR), said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value;
 wherein said adaptive calculating section resets said motor correction signal to zero in accordance with said steering angle and said action force when said vehicle departs from the straight running state, sets an upper first threshold (TH1) and a lower second threshold (TH2) that are smaller than a maximum correction value for said motor correction signal, stores said steering angle at a time when an absolute value of said motor correction signal exceeds said first threshold (TH1) as a first steering angle, sets a third threshold (TH3) larger than said first steering angle and a fourth threshold (TH4) smaller than said first steering angle, and reduces said motor correction signal when said steering angle exceeds said third threshold (TH3) or said fourth threshold (TH4);
 wherein said adaptive calculating section comprises a first condition judging section that outputs a first judgment output (CN1) based on a present value and a previous value of said motor correction signal, a second condition judging section that outputs a fourth judgment output (CN4) and a fifth judgment output (CN5) based on said straight running judgment result (SR), said steering angle, said first judgment output (CN1), said motor correction signal and a second judgment output (CN2), a third condition judging section that outputs a third judgment output (CN3) based on said steering angle, said fourth judgment output (CN4) and said fifth judgment output (CN5), and a logical outputting section that outputs a steering state signal by a logical product of said straight running judgment result (SR) and said third judgment output (CN3), inputs said fifth judgment output (CN5) into a memory, makes said fifth judgment output (CN5) into said second judgment output (CN2), and switches a signal (SG3) on which said motor correction signal is based depending on said steering state signal; and
 wherein said third condition judging section performs a fourth judgment determining when said fifth judgment output (CN5) is 0, and a fifth judgment determining when an absolute value of a difference between said first steering angle and said steering angle is larger than a predetermined value (S3), outputs said third judgment output (CN3) equal to 1 when said fourth judgment is established, outputs said third judgment output (CN3) equal to 0 when said fourth judgment is not established and said fifth judgment is established, and outputs said third judgment output (CN3) equal to 1 when said fourth judgment is not established and said fifth judgment is not established either.

15. The electric power steering apparatus according to claim 14, wherein reducing said motor correction signal is reducing said motor correction signal towards zero.

16. The electric power steering apparatus according to claim 14, wherein said first threshold (TH1) and said second threshold (TH2) are larger than zero, and said third threshold (TH3) and said fourth threshold (TH4) have an equal width of said predetermined value (S3) for said first steering angle respectively.

17. The electric power steering apparatus according to claim 14, which releases storing of said first steering angle and setting of said third thresholds (TH3) and said fourth threshold (TH4) when said motor correction signal becomes smaller than said second threshold (TH2) after reducing said motor correction signal.

18. An electric power steering apparatus that calculates a current command value of a motor which provides a steering mechanism with a steering assist torque based on a steering torque and a vehicle speed of a vehicle, and drives and controls said motor by feedback control, comprising:
 a motor current correction value calculating section that judges a running state of said vehicle based on an action force added to the steering mechanism, a steering angle of said steering mechanism and said vehicle speed, and calculates and outputs a motor current correction value based on a judgment result of said running state and said action force;

wherein said electric power steering apparatus corrects said current command value by said motor current correction value, and drives and controls said motor;

wherein said motor current correction value calculating section comprises a straight running state judging section that judges a straight running state of said vehicle and outputs a straight running judgment result (SR), an adaptive calculating section that calculates and outputs a motor correction signal according to said straight running judgment result (SR), said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value;

wherein said adaptive calculating section resets said motor correction signal to zero in accordance with said steering angle and said action force when said vehicle departs from the straight running state, sets an upper first threshold (TH1) and a lower second threshold (TH2) that are smaller than a maximum correction value for said motor correction signal, stores said steering angle at a time when an absolute value of said motor correction signal exceeds said first threshold (TH1) as a first steering angle, sets a third threshold (TH3) larger than said first steering angle and a fourth threshold (TH4) smaller than said first steering angle, and reduces said motor correction signal when said steering angle exceeds said third threshold (TH3) or said fourth threshold (TH4);

wherein said adaptive calculating section comprises a first condition judging section that outputs a first judgment output (CN1) based on a present value and a previous value of said motor correction signal, a second condition judging section that outputs a fourth judgment output (CN4) and a fifth judgment output (CN5) based on said straight running judgment result (SR), said steering angle, said first judgment output (CN1), said motor correction signal and a second judgment output (CN2), a third condition judging section that outputs a third judgment output (CN3) based on said steering angle, said fourth judgment outputs (CN4) and said fifth judgment output (CN5), and a logical outputting section that outputs a steering state signal by a logical product of said straight running judgment result (SR) and said third judgment output (CN3), inputs said fifth judgment output (CN5) into a memory, makes said fifth judgment output (CN5) into said second judgment output (CN2), and switches a signal (SG3) on which said motor correction signal is based depending on said steering state signal; and wherein said third condition judging section performs a fourth judgment determining when said fifth judgment output (CN5) is 0, and a sixth judgment determining when said steering angle is larger than said third threshold (TH3) or said steering angle is smaller than said fourth threshold (TH4), outputs said third judgment output (CN3) equal to 1 when said fourth judgment is established, outputs said third judgment output (CN3) equal to 0 when said fourth judgment is not established and said sixth judgment is established, and outputs said third judgment output (CN3) equal to 1 when said fourth judgment is not established and said sixth judgment is not established either.

19. The electric power steering apparatus according to claim 18, wherein reducing said motor correction signal is reducing said motor correction signal towards zero.

20. The electric power steering apparatus according to claim 18, wherein said first threshold (TH1) and said second threshold (TH2) are larger than zero, and said third threshold (TH3) and said fourth threshold (TH4) have an equal width of a predetermined value (S3) for said first steering angle respectively.

21. The electric power steering apparatus according to claim 18, which releases storing of said first steering angle and setting of said third thresholds (TH3) and said fourth threshold (TH4) when said motor correction signal becomes smaller than said second threshold (TH2) after reducing said motor correction signal.

22. An electric power steering method comprising:
calculating, by a processor, a current command value for a steering motor based on a steering torque and a vehicle speed, wherein the processor drives and controls the steering motor by a feedback control,
wherein the calculating the current command value comprises:
determining a running state of the vehicle based on an action force, a steering angle, and the vehicle speed,
calculating a motor current correction value based on the determined running state and the action force,
correcting the current command value by the motor current correction value,
in response to the determined running state being not a straight running state, resetting the motor current correction value to zero,
setting an upper threshold and a lower threshold that are smaller than a maximum value of the motor current correction value, wherein the upper threshold is a first threshold (TH1) and the lower threshold is a second threshold (TH2),
determining when an absolute value of the motor current correction value exceeds the first threshold (TH1);
in response to the determining that the absolute value of the motor current correction value exceeds the first threshold (TH1), storing in a memory the steering angle as a first steering angle,
setting a third threshold (TH3) larger than the first steering angle and a fourth threshold (TH4) smaller than the first steering angle,
determining when the steering angle exceeds the third threshold (TH3) or the fourth threshold (TH4),
in response to the determining that the steering angle exceeds the third threshold (TH3) or the fourth threshold (TH4), reducing the motor current correction value,
determining a first judgment value (CN1) based on a present value and a previous value of the motor current correction value,
determining a second judgment value (CN4) and a third judgment value (CN5) based on the determined running state, the steering angle, the first judgment value, the motor current correction value and a fourth judgment output value (CN2),
determining a fifth judgment value (CN3) based on the steering angle, the second judgment value (CN4), and the third judgment value (CN5), and outputting, to a steering mechanism of the motor, a steering state signal which is a logical product of the determined running state and the fifth judgment value (CN3), storing in the memory the third judgment value (CN5), after the storing of the third judgment value (CN5), changing the third judgment value (CN5) into the fourth judgment value (CN2), and switching a signal on which the motor current correction value is based depending on the determined running state; and determining when an absolute value of a present value of the motor current correction value is larger than the first threshold (TH1) and an absolute value of a previous value of the motor current correction value is smaller than or equal to the first threshold (TH1), in response to the determining indicating that the absolute value of the present value of the motor current correction value is larger than the first threshold (TH1) and the absolute value of the previous value of the motor current correction value is smaller than or equal to the first threshold (TH1), setting the first judgment value (CN1) to 1, and in response to the determining indicating that the absolute value of the present value of the motor current correction value not being larger than the first threshold (TH1) or the absolute value of the previous value of the motor current correction value being larger than the first threshold (TH1), setting the first judgment value (CN1) to 0.

\* \* \* \* \*